(12) United States Patent
Keel et al.

(10) Patent No.: US 8,442,094 B2
(45) Date of Patent: May 14, 2013

(54) CELL SEARCH USING RAKE SEARCHER TO PERFORM SCRAMBLING CODE DETERMINATION

(75) Inventors: Alton Shelborne Keel, Melbourne, FL (US); Louis Robert Litwin, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 634 days.

(21) Appl. No.: 11/795,062

(22) PCT Filed: Jan. 14, 2005

(86) PCT No.: PCT/US2005/001188
§ 371 (c)(1),
(2), (4) Date: Jul. 10, 2007

(87) PCT Pub. No.: WO2006/078234
PCT Pub. Date: Jul. 27, 2006

(65) Prior Publication Data
US 2008/0025376 A1    Jan. 31, 2008

(51) Int. Cl.
*H04B 1/00* (2006.01)
(52) U.S. Cl.
USPC .................. 375/149; 375/140; 375/147
(58) Field of Classification Search .................. 375/149
See application file for complete search history.

(56) References Cited

U.S. PATENT DOCUMENTS

| | | | |
|---|---|---|---|
| 5,060,239 A * | 10/1991 | Briscoe et al. | 375/260 |
| 5,483,292 A * | 1/1996 | Ko | 348/537 |
| 5,648,893 A | 7/1997 | Loo et al. | |
| 5,648,983 A | 7/1997 | Kostic et al. | |
| 5,764,687 A | 6/1998 | Easton | |
| 5,796,775 A * | 8/1998 | Aoyama | 375/150 |
| 5,995,512 A * | 11/1999 | Pogue, Jr. | 370/419 |
| 6,067,293 A | 5/2000 | Shoji | |
| 6,185,199 B1 | 2/2001 | Zehavi | |
| 6,366,606 B1 | 4/2002 | Sriram | |
| 6,480,527 B1 | 11/2002 | Kim | |
| 6,700,925 B1 | 3/2004 | Ohnishi | |
| 6,771,693 B2 | 8/2004 | Hackett | |

(Continued)

FOREIGN PATENT DOCUMENTS

| | | |
|---|---|---|
| CN | 1189265 | 7/1998 |
| CN | 1280428 | 7/2001 |

(Continued)

OTHER PUBLICATIONS

Sanat Kamal Bahl: Reconfigurable Synchronization Circuit for Software Defined Radios Using On-Chip Processor in FPGAs, Dept. of Computer Science and Electrical Engineering, Univ. of Maryland Baltimore County, Abstract and Drawings.

(Continued)

*Primary Examiner* — Erin File
(74) *Attorney, Agent, or Firm* — Robert D. Shedd; Joseph J. Opalach

(57) ABSTRACT

A spread spectrum receiver configured to perform cell searching can include a cell search system and a searcher. The cell search system is configured to perform primary and secondary synchronization, thereby identifying a scrambling code group. The searcher is configured to determine a scrambling code from the scrambling code group identified by the cell search system.

15 Claims, 2 Drawing Sheets

U.S. PATENT DOCUMENTS

| | | | |
|---|---|---|---|
| 6,888,372 B1 * | 5/2005 | Hazanchuk | 326/39 |
| 7,130,331 B2 | 10/2006 | Kang et al. | |
| 7,248,635 B1 * | 7/2007 | Arneson et al. | 375/257 |
| 7,327,779 B1 | 2/2008 | Lugil et al. | |
| 7,352,704 B1 | 4/2008 | Toussi et al. | |
| 7,532,663 B2 | 5/2009 | Lewis | |
| 7,630,730 B2 * | 12/2009 | Becker et al. | 455/522 |
| 7,684,472 B2 * | 3/2010 | Litwin et al. | 375/150 |
| 2001/0004378 A1 | 6/2001 | Takeuchi et al. | |
| 2001/0036222 A1 | 11/2001 | Doetsch et al. | |
| 2002/0110103 A1 | 8/2002 | Jung | |
| 2002/0110123 A1 | 8/2002 | Shitama | |
| 2003/0103476 A1 | 6/2003 | Choi et al. | |
| 2003/0103557 A1 * | 6/2003 | Dolwin | 375/150 |
| 2003/0123528 A1 | 7/2003 | Hackett | |
| 2003/0156462 A1 | 8/2003 | Lim et al. | |
| 2003/0161390 A1 | 8/2003 | Teague et al. | |
| 2003/0169702 A1 * | 9/2003 | Ryu et al. | 370/320 |
| 2003/0176171 A1 | 9/2003 | Sato et al. | |
| 2003/0193922 A1 | 10/2003 | Ho et al. | |
| 2003/0202541 A1 * | 10/2003 | Lim et al. | 370/503 |
| 2003/0202565 A1 | 10/2003 | Li et al. | |
| 2003/0223384 A1 * | 12/2003 | Sengupta et al. | 370/320 |
| 2003/0235238 A1 | 12/2003 | Schelm et al. | |
| 2004/0017846 A1 | 1/2004 | Fernandez-Corbaton | |
| 2004/0062297 A1 | 4/2004 | McDonough et al. | |
| 2004/0071199 A1 | 4/2004 | Boesel et al. | |
| 2004/0085921 A1 * | 5/2004 | Lin | 370/324 |
| 2004/0127213 A1 * | 7/2004 | Hwang | 455/423 |
| 2004/0165566 A1 * | 8/2004 | Lee et al. | 370/342 |
| 2004/0240529 A1 | 12/2004 | Leonard et al. | |
| 2004/0250049 A1 | 12/2004 | Becker et al. | |
| 2005/0002369 A1 * | 1/2005 | Ro et al. | 370/342 |
| 2005/0002442 A1 | 1/2005 | Litwin et al. | |
| 2005/0002446 A1 | 1/2005 | Litwin et al. | 375/150 |
| 2005/0047488 A1 * | 3/2005 | Sugahara | 375/148 |
| 2005/0047492 A1 * | 3/2005 | Amerga et al. | 375/150 |
| 2005/0053049 A1 * | 3/2005 | Blanz et al. | 370/350 |
| 2005/0100230 A1 | 5/2005 | Moore | |
| 2005/0207479 A1 | 9/2005 | Ruprich et al. | |
| 2005/0208959 A1 * | 9/2005 | Chen et al. | 455/515 |
| 2005/0225804 A1 | 10/2005 | Arquilevich et al. | |
| 2006/0126491 A1 * | 6/2006 | Ro et al. | 370/208 |
| 2006/0188005 A1 | 8/2006 | Espax | |
| 2006/0199596 A1 * | 9/2006 | Teauge et al. | 455/458 |
| 2007/0025428 A1 * | 2/2007 | Hahm et al. | 375/149 |
| 2007/0189410 A1 * | 8/2007 | Zeng | 375/267 |
| 2007/0195864 A1 * | 8/2007 | Jonsson et al. | 375/148 |
| 2008/0130720 A1 * | 6/2008 | Dolwin | 375/149 |
| 2008/0225963 A1 | 9/2008 | Lakkis | |
| 2009/0258605 A1 | 10/2009 | Boos | |

FOREIGN PATENT DOCUMENTS

| | | |
|---|---|---|
| CN | 1365211 | 8/2002 |
| DE | 10241693 | 3/2004 |
| EP | 0691754 | 1/1996 |
| EP | 0994572 | 4/2000 |
| EP | 1075090 | 2/2001 |
| EP | 1109323 | 6/2001 |
| EP | 1517454 | 3/2005 |
| JP | 10173629 | 6/1998 |
| JP | 10240388 | 9/1998 |
| JP | 2000124847 | 4/2000 |
| JP | 20000349681 | 12/2000 |
| JP | 2004164566 | 6/2004 |
| JP | 2006520149 | 8/2006 |
| WO | WO2004082149 | 9/2004 |

OTHER PUBLICATIONS

WCDMA Baseband Design Faces Challenges, Wireless Systems Design, Jan./Feb. 2003, pp. 34-37.

Search Report Dated Aug. 23, 2005.

Kiessling et al., "Performance Enhancements to the UMTS (W-CDMA) Initial Cell Search Algorithm", Agere Systems, IEEE, 2002.

\* cited by examiner

CELL SEARCH USING RAKE SEARCHER TO PERFORM SCRAMBLING CODE DETERMINATION

This application claims the benefit, under 35 U.S.C. §365 of International Application PCT/US2005/001188, filed Jan. 14, 2005, which was published in accordance with PCT Article 21(2) on July 27, 2006 in English. This application is related to copending, commonly assigned, U.S. patent applications Ser. Nos., 11/795,049 entitled EFFICIENT MAXIMAL RATIO COMBINER FOR CDMA SYSTEMS, filed on Jul. 10, 2007; 11/794,973 entitled RAM-BASED SCRAMBLING CODE GENERATOR FOR CDMA, filed on Jul. 9, 2007; 11/792,885 entitled HARDWARE-EFFICIENT SEARCHER ARCHITECTURE FOR CDMA CELLULAR RECEIVERS, filed on Jun. 11, 2007; and 11/795,063 entitled METHOD AND SYSTEM FOR SUB-CHIP RESOLUTION FOR SECONDARY CELL SEARCH, filed on Jul. 10, 2007.

BACKGROUND OF THE INVENTION

The present invention generally relates to a receiver architecture for use with spread spectrum and Code Division Multiple Access (CDMA) wireless networks.

Universal Mobile Telecommunications System (UMTS) is a standard for 3G wireless networks, as defined by the International Telecommunications Union (ITU). UMTS defines a communication scheme composed of slots, with 15 slots forming a frame. Each slot specifies, among other data, synchronization information used to synchronize communications between nodes of a UMTS compliant network.

An important procedure performed by a receiver within a UMTS network, for example a CDMA mobile receiver, is the cell search operation. Cell searching typically is performed by a cell search system that is incorporated as part of the receiver. The cell search system is activated after the receiver is powered on to determine synchronization information pertaining to the cell in which the receiver is located. The cell search operation is a three stage process. That is, the cell search system performs slot synchronization (primary synchronization), frame synchronization and scrambling code group determination (secondary synchronization), and scrambling code determination.

In performing cell searching, the cell search system accesses a Synchronization Channel (SCH) and a Common Pilot Channel (CPICH) of the received wireless signal. The SCH is a composite channel formed from a Primary SCH and a Secondary SCH. Within each slot, the Primary SCH specifies a Primary Synchronization Code (PSC). The Primary SCH, however, only contains data during the first 256 chips of each 2560 chip slot. As is known, "chip" or "chip rate" refers to the rate of the spreading code within a CDMA communication system.

The cell search system of the receiver uses the Primary SCH to acquire slot synchronization with a cell. Typically this is performed using a single matched filter, or other similar device. The filter is matched to the PSC which is common to all cells. The slot timing of a cell can be obtained by detecting peaks in the matched filter output.

The cell search system of the receiver performs frame synchronization using the Secondary SCH. The Secondary SCH specifies, within each slot, a Secondary Synchronization Code (SSC). Unlike the PSC, the SSC can be one of 16 different codes. Each slot contains one SSC. The SSC used varies from slot to slot to form a sequence that has a period of one frame, or 15 slots. There are 64 possible SSC sequences and each sequence corresponds to one of 64 possible scrambling code groups. By observing a full frame of data, the receiver can determine which of the 64 SSC sequences is being transmitted. Since the SSC sequence repeats with a period equal to one frame, the sequence can be used to achieve frame synchronization at the receiver because frame boundaries can be identified. The SSC sequence that is transmitted further indicates which scrambling code group is used in the current cell.

Each scrambling code group includes 8 possible scrambling codes. To determine the actual scrambling code, the cell search system of the receiver correlates the received CPICH signal with each of the 8 possible scrambling codes in the identified scrambling code group until the correct scrambling code is determined. After the actual scrambling code has been identified, the Primary Common Control Channel (CCPCH) can be detected so that system and cell specific Broadcast Channel (BCH) information can be read.

A conventional cell search system typically includes a matched filter correlator for correlating the received samples against the CPICH sequence. Peak detection hardware also is included to locate the peak of the 8 correlations for a given scrambling code group. Other logic also is included to determine which of the peaks is the strongest of the 8 so that a particular scrambling code from the 8 in the scrambling code group can be identified.

Conventional cell search designs are expensive both in terms of the amount of hardware required and the increased power usage. Traditionally, a cell search system is implemented as an application specific integrated circuit (ASIC). Because the system is large, an increased die size is required for fabrication. Larger ASIC designs include more gates, which consume more power. This can be critical with respect to battery life in a mobile receiver. These problems are exacerbated in that scrambling code determination is performed infrequently—typically only when the receiver is powered on or loses lock.

As such, it would be desirable to reduce the amount of hardware required within a receiver for the cell search process and thus reduce the power consumption of the cell search system in the receiver.

SUMMARY OF THE INVENTION

In accordance with the principles of the invention, we have realized it is possible to further reduce the amount of hardware required in the cell search system of the receiver. In particular, the cell search system performs primary and secondary synchronization while identification of the scrambling code is moved from the cell search system to the searcher of the receiver. Thus, the hardware associated with the scrambling code identification in the cell search system can be eliminated.

In an illustrative embodiment, the receiver is a CDMA receiver. Illustratively, the cell search system is deactivated after performing secondary synchronization to determine the associated scrambling code group. The searcher is then activated after the secondary synchronization is performed by the cell search system. The searcher correlates each scrambling code of the associated scrambling code group with a received Common Pilot Channel (CPICH) signal and selects that scrambling code having the largest correlation peak. The searcher further can correlate different offsets of each scrambling code of the scrambling code group.

In accordance with a feature of the invention, the receiver can include a scrambling code generator that dynamically generates at least one scrambling code of the associated scrambling code group. The dynamically generated scrambling code(s) can be used by the searcher to select the particular scrambling code. In another embodiment, a memory can be included that stores at least one pre-generated scrambling code of the associated scrambling code group. In that case, the searcher reads the one or more scrambling codes of the associated scrambling code group from the memory for selecting the particular scrambling code.

Another aspect of the present invention can include a method of cell searching for use with a spread spectrum receiver, such as a CDMA receiver. The method can include performing a primary and a secondary synchronization using a cell search system, thereby identifying a scrambling code group, and selecting a scrambling code from the scrambling code group using a searcher.

The method can include deactivating the cell search system after the performing step and activating the searcher prior to the selecting step. The scrambling code can be selected by correlating each scrambling code of the scrambling code group with a received CPICH signal and selecting that scrambling code having the largest correlation peak. In performing the correlations, different offsets of each scrambling code of the scrambling code group can be correlated.

Illustratively, the method can include storing at least one scrambling code of the scrambling code group within a memory and reading one or more scrambling codes of the scrambling code group from the memory for performing the correlating step as needed. In another embodiment, the method can include dynamically, generating at least one scrambling code for use in the correlating step.

BRIEF DESCRIPTION OF THE DRAWINGS

Preferred embodiments of the present invention will be described below in more detail, with reference to the accompanying drawings, in which.

DETAILED DESCRIPTION

Other than the inventive concept, the elements shown in the figures are well known and will not be described in detail. Also, familiarity with UMTS-based wireless communications systems is assumed and is not described in detail herein. For example, other than the inventive concept, spread spectrum transmission and reception, cells (base stations), user equipment (UE), downlink channels, uplink channels, the searcher and RAKE receivers are well known and not described herein. In addition, the inventive concept may be implemented using conventional programming techniques, which, as such, will not be described herein. Finally, like-numbers on the figures represent similar elements.

The present invention provides a solution for determining scrambling codes within a receiver. In accordance with the inventive arrangements disclosed herein, cell searching is implemented not as a three stage process but as a two stage process where primary synchronization and secondary synchronization are performed by a cell search system and scrambling code determination is performed using other existing hardware in the receiver, such as a searcher.

More particularly, after the Secondary SCH channel is acquired by cell search hardware, that cell search hardware or system can be deactivated to conserve power. The searcher then can be enabled. Typically, the searcher hardware is used to identify multipath components. Since the searcher is already configured to perform such processing we have realized that the existing searcher hardware can, in accordance with the principles of the invention, also be used for purposes of scrambling code determination. Accordingly, the hardware necessary to implement the cell search system can be reduced.

Figure 1:
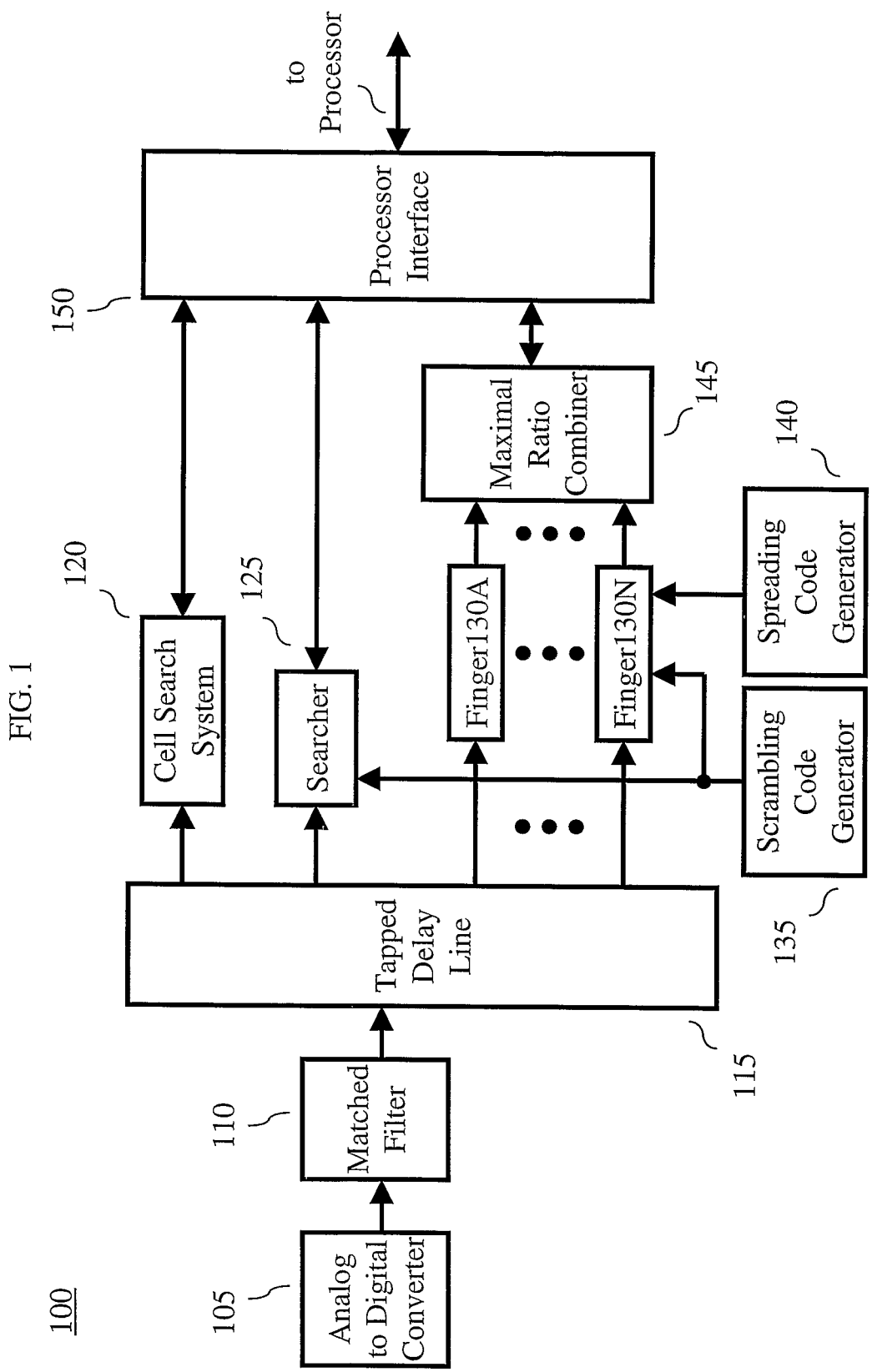
FIG. 1 is a schematic diagram illustrating one embodiment of a receiver in accordance with the inventive arrangements disclosed herein.

FIG. 1 is a schematic diagram illustrating one embodiment of a receiver 100 in accordance with the inventive arrangements disclosed herein. In one aspect of the present invention, the receiver 100 is a UMTS receiver such as a CDMA receiver. As shown in FIG. 1, the receiver 100 comprises an analog-to-digital converter 105 for converting received analog signals into digital representations thereof. The resulting digital signal is provided to a matched filter 110.

Filtered signals are provided to a tapped delay line 115, which further provides signals to a cell search system 120, a searcher 125, as well as one or more fingers 130A-130N. The tapped delay line 115 includes a plurality of taps through which various samples of a multipath signal can be provided. Each tap can provide samples for a different delayed version of a received multipath signal.

The signal provided to the cell search system 120 includes timing information. In particular, the signal includes a composite Synchronization Channel (SCH) and a Common Pilot Channel (CPICH), allowing the cell search system 120 to determine timing information from the provided signal. The cell search system 120 performs two stages of the cell search operation. Specifically, slot synchronization is performed using the primary SCH and frame synchronization and scrambling code group determination is performed using the secondary SCH. As noted, the cell search system 120 need not perform the third stage of scrambling code determination. Thus, such hardware can be excluded from the cell search system 120, thereby reducing size and power consumption.

Once the secondary SCH is acquired, the cell search system 120 can be deactivated or powered down. For example, the cell search system 120 can be placed in a standby mode. The searcher 125, which may be in a standby or low power mode, then can be activated or energized. Once energized, the searcher 125 performs the third stage of scrambling code determination. The cell search system 120 and the searcher 125 can be implemented as one or more integrated circuits (IC's), ASICs, processors, controllers, discrete components, or any combination thereof.

A processor (not shown) can be included to facilitate communications among the various components of the receiver 100 through the processor interface 150. Thus, the searcher 125, using the scrambling code group determined by the cell search system 120, can be used to identify the particular scrambling code to be used. Once the searcher 125 is enabled, the searcher searches or correlates the Common Pilot Channel (CPICH) signal against each of the 8 scrambling codes in the scrambling code group determined by the cell search system 120.

Since the cell search system 120 has already achieved slot and frame synchronization, the searcher 125 need only correlate against a small number of scrambling code offsets in the beginning of the searcher space (e.g., from offset 0 to offset M). In the UMTS standard, there are 8 scrambling codes in a given scrambling code group. The highest correlation value of each of the eight searches is identified and the values can be stored. It should be appreciated that since similar functions are performed during normal searcher operations, no additional hardware is required in the searcher 125. The scrambling code used by the wireless transmitter is then identified as the code that corresponds to the highest correlation peak. The latter is illustratively performed by processor 150 accessing memory (not shown) of searcher 125.

Scrambling code generation, as performed by the scrambling code generator 135, can be performed using any of a variety of different techniques. In one embodiment, the 8 scrambling codes can be generated on-the-fly. That is, the scrambling code generator 135 can generate each scrambling code dynamically for use in the correlation as needed. For example, and as known in the art, a scrambling code generator utilizes hardware-implemented linear feedback shift registers (LFSRs) to generate scrambling codes, one LFSR per scrambling code. An LFSR generates a scrambling code dynamically, or "on the fly", with a new scrambling code chip value being generated for each chip. (A scrambling code covers a UMTS frame (38,400 chips) and comprises 38,400 chip values.)

In another embodiment, one or more, or all 8 scrambling codes can be generated prior to the beginning the third stage. For example, the pre-generated scrambling codes can be stored in a memory by the processor. Thus, the scrambling code generator 135 can be implemented as a memory or a memory block, such as a memory with accompanying logic for storing the 38,400 chip values of the scrambling code. (It should be noted that each scrambling code chip value may further comprise in-phase (I) and quadrature (Q) components.) Notably, if all 8 scrambling codes are stored within the scrambling code memory, it is possible for the receiver to later communicate with multiple base stations, for example during a so-called "soft handoff", where each base station communicates using a different scrambling code.

Once the scrambling code is determined, the searcher 125 returns to it previous task of correlating the multipath signal against the scrambling code to obtain profiles of, and for identifying, the locations of the various paths within the multipath signal. Each of the fingers 130A-130N can then be assigned to a different path of the multipath signal as determined by the searcher 125.

As known in the art, fingers 130A-130N further process the various paths using a spreading code provided by a spreading code generator 140. A maximal ratio combiner (MRC) 145 phase aligns the individual multi-path signals from each finger 130A-130N using the CPICH signal. The maximal ratio combiner 145 produces a constructively combined signal that is provided to a processor interface 150.

It should be appreciated that because the taps of the tapped delay line 115 each provide a different version of the delayed multipath signal, delay hardware is unnecessary. In other words, each different version of the multipath signal provided from a particular tap of the tapped delay line 115 is time aligned with other versions provided from other taps. As such, no delay hardware need be incorporated between the outputs of the fingers 130A-130N and the MRC 145.

Figure 2:
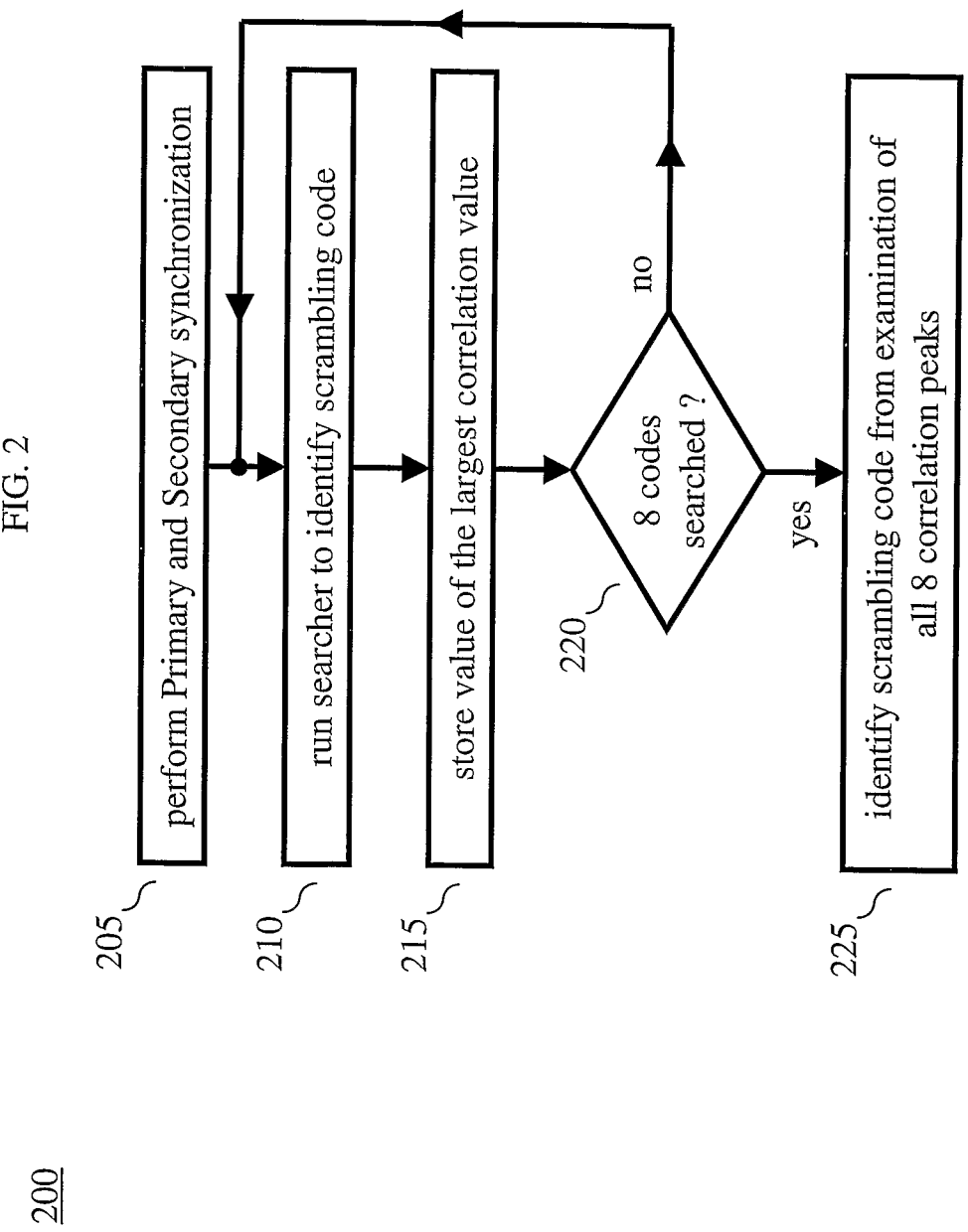
FIG. 2 is a flow chart illustrating a method of determining a scrambling code in accordance with another embodiment of the present invention.

FIG. 2 is a flow chart illustrating a method 200 for use in a receiver for determining a scrambling code in accordance with the principles of the invention. The method illustratively begins in step 205 where primary and secondary SCH synchronization is performed by, e.g., cell search system 120 of FIG. 1. Accordingly, a scrambling code group is identified from step 205. Since the cell search system is no longer required after step 205, the cell search system can be powered down to further reduce power consumption.

In step 210, and in accordance with the principles of the invention, the searcher is run using one of the scrambling codes from the identified scrambling code group. The searcher is run over a short window of offsets from 0 to some value M. Since slot and frame synchronization have already been achieved (in step 205), the searcher need only correlate against a small window of scrambling code offsets. For example, if the cell search synchronized accurately (i.e., the correct scrambling code group was identified), correlation need only involve several scrambling code offsets (M=4). Otherwise, the window can be set to be several chips wide to ensure that the peak is found. Illustratively, in the case where the searcher is inactive until needed, the searcher can be activated prior to step 210.

In step 215, the largest correlation value found in the window of offsets of 0 to M from step 210 is stored. Illustratively, the correlations are compared in terms of magnitude so that the largest correlation value with respect to magnitude is stored. In step 220, a determination is made as to whether all 8 scrambling codes have been searched of the identified scrambling code group. If all of the scrambling codes have been processed, the method 200 proceeds to step 225. If not, the method 200 loops back to step 210 so that the searcher is run with the next scrambling code of the identified scrambling code group. Steps 210, 215, 220 are repeated until all of the scrambling codes of the identified scrambling code group have been processed.

In step 225, the 8 stored correlation peaks from processing the 8 scrambling codes of the identified scrambling code group are evaluated. The largest correlation peak is selected and the scrambling code that corresponds to the largest of the 8 correlation peaks is identified as the scrambling code used by the wireless transmitter. , Once the scrambling code is determined, the various paths of the multipath signal can be processed as described above. More particularly, the paths can be extracted, derotated, and then summed.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs) and/or in one or more stored program-controlled processors (e.g., a microprocessor or digital signal processor (DSP)). Similarly, although illustrated in the context of a UMTS-based system, the inventive concept is applicable to other communications system. It is therefore to be understood that numerous modifications may be made to the illustrative embodiments and that other arrangements may be devised without departing from the spirit and scope of the present invention as defined by the appended claims.

The invention claimed is:

1. A receiver comprising:
   a cell search system for only performing primary and secondary synchronization to a received wireless signal for identifying a scrambling code group associated with a scrambling code with which the wireless signal had been scrambled, wherein the cell search system does not perform identification of the scrambling code;
   a searcher, separate from the cell search system, for identifying the scrambling code in the associated scrambling code group and for correalating the received wireless signal against the scrambling code thus identified for identifying multipath components of the received wireless signal; and
   a processor, wherein (1) the processor activates the searcher after the cell search system acquires primary and secondary synchronization and identifies the scrambling code group and (2) the processor controls the searcher to process the received wireless signal for (a) identifying the scrambling code, and (b) identifying multipath components of the received wireless signal.

2. The receiver of claim 1, wherein said cell search system is deactivated after performing the secondary synchronization.

3. The receiver of claim 1, further comprising a scrambling code generator dynamically generating at least one scrambling code of the associated scrambling code group for use by said searcher to identify the scrambling code.

4. The receiver of claim 1, further comprising a memory storing at least one pre-generated scrambling code of the associated scrambling code group.

5. The receiver of claim 4, wherein said searcher reads the at least one scrambling code of the associated scrambling code group from said memory for identifying the scrambling code.

6. The receiver of claim 1, wherein said searcher correlates each scrambling code of the associated scrambling code group with a received Common Pilot Channel (CPICH) signal and identifies the scrambling code having a largest correlation peak.

7. The receiver of claim 6, wherein said searcher correlates different offsets of each scrambling code of the associated scrambling code group.

8. The receiver of claim 1, wherein the spread spectrum receiver is a Code Division Multiple Access (CDMA) receiver.

9. A method for use in a receiver, the method comprising:
receiving, with the receiver, a wireless signal scrambled with a scrambling code;
using a cell search system for only performing primary and secondary synchronization to the received wireless signal for identifying a scrambling code group associated with the scrambling code, wherein the cell search system does not perform identification of the scrambling code;
using a searcher, separately from the cell search system, for identifying the scrambling code in the associated scrambling code group and for correlating the received wireless signal against the scrambling code thus identified for identifying multipath components of the received wireless signal; and
using a processor to control the searcher, further comprising
(1) activating the searcher after the cell search system acquires primary and secondary synchronization and identifies the scrambling code group and
(2) controlling the searcher to process the received wireless signal for (a) identifying the scrambling code, and (b) identifying multipath components of the received wireless signal.

10. The method of claim 9, further comprising the step of deactivating the cell search system after said performing step.

11. The method of claim 9, said using a searcher comprising:
correlating each scrambling code of the associated scrambling code group with a received Common Pilot Channel (CPICH) signal; and
identifying the scrambling code having a largest correlation peak.

12. The method of claim 11, said correlating step further comprising the step of correlating different offsets of each scrambling code of the associated scrambling code group.

13. The method of claim 11, further comprising the steps of:
storing at least one scrambling code of the associated scrambling code group within a memory; and
reading the at least one scrambling code of the associated scrambling code group from the memory for performing said correlating step as needed.

14. The method of claim 11, further comprising the step of dynamically generating at least one scrambling code for use in said correlating step.

15. The method of claim 9, wherein the receiver is a Code Division Multiple Access (CDMA) receiver.

\* \* \* \* \*